Sept. 15, 1959     R. K. SCHWEBS     2,903,996
APPARATUS FOR COATING THE ENDS OF CORN EARS WITH WAX
Filed Nov. 19, 1956     2 Sheets-Sheet 1

INVENTOR
ROBERT K. SCHWEBS
BY
ATTORNEYS

Sept. 15, 1959   R. K. SCHWEBS   2,903,996
APPARATUS FOR COATING THE ENDS OF CORN EARS WITH WAX
Filed Nov. 19, 1956   2 Sheets-Sheet 2
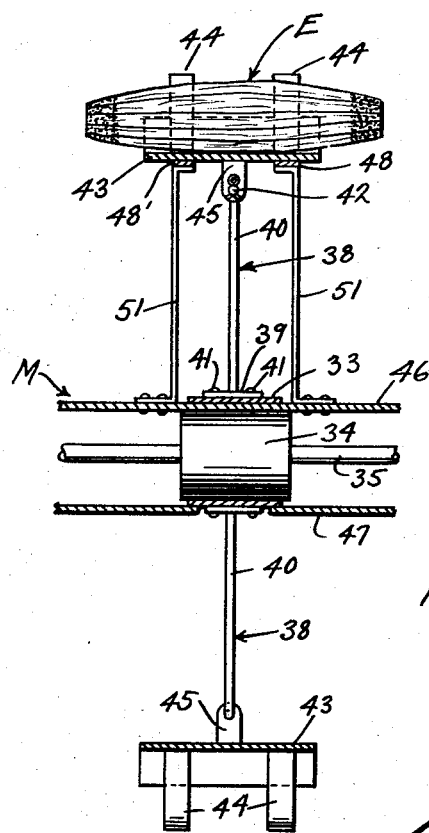
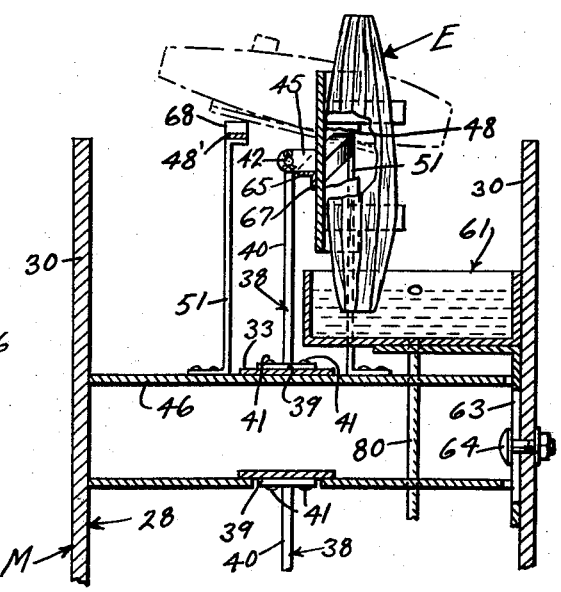
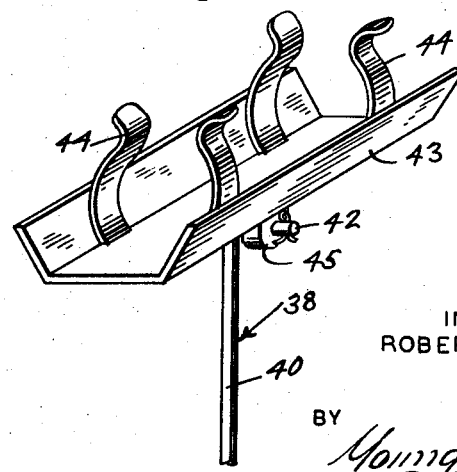
INVENTOR
ROBERT K. SCHWEBS
BY *Young and Wright*
ATTORNEYS

United States Patent Office 2,903,996
Patented Sept. 15, 1959

2,903,996

APPARATUS FOR COATING THE ENDS OF CORN EARS WITH WAX

Robert K. Schwebs, Appleton, Wis.

Application November 19, 1956, Serial No. 623,234

11 Claims. (Cl. 118—23)

This invention appertains to a machine and method for treating fresh, sweet corn, whereby to effectively aid in the maintenance of the corn in a fresh, salable and edible condition for a considerable length of time.

It has been proposed to cut off the ends of ears of fresh corn to improve the appearance thereof and to save on shipping space. It has been found that the cutting off of the opposite ends of the corn tends to quickly dry out the corn. In experiments conducted to determine the reason for this, it has been found that the cutting off of the corn ends exposes the pith of the cob to the atmosphere and that the pith quickly dries out. The drying out of the pith actually causes a drawing on the kernels and the kernels themselves soon become dry and unwholesome. In further experiments, it has been determined that it is well to expose a major portion of the body of the ears, so that the corn can be iced and so that the consumer can inspect the same.

The drying out of the corn creates great waste and this materially adds to the overall, ultimate consumer cost.

I have discovered that immediately upon the cutting off of the ends of the corn, that if the exposed ends are sealed by wax or other suitable substance, the drying out of the corn is materially delayed and the corn is maintained in a fresh, salable and palatable condition.

It is, therefore, one of the primary objects of my invention to provide means for aiding in the maintenance of green corn in a fresh salable condition by first trimming off the opposite ends of the ears of corn; second, dipping the exposed ends of the corn in molten wax for a predetermined distance, say a half inch, cooling the wax for sealing the ends of the corn and for holding the husks of the corn in place and for sealing in the milk of cut kernels instant to the trimming of the ears.

A further object of my invention is to provide a unitary machine embodying an endless conveyor for carrying fresh ears of corn longitudinally of the machine with means for simultaneously trimming off the opposite ends of the ears and then for automatically dipping the ears at one end in wax and then dipping the opposite ends of the ears in wax with simultaneous cooling means and for finally automatically removing the ears from the conveyor.

A further object of my invention is the provision of novel means on the conveyor for firmly gripping the ears so that the ears can be effectively trimmed and so that the ears can be tilted for waxing and cooling purposes.

A further important object of my invention is the provision of novel guide tracks for supporting the corn gripping means on the belt and for bringing about the tilting of the gripping means so that the terminals of the trimmed ears can be effectively waxed and cooled.

A still further object of my invention is the provision of means for supplying and maintaining wax in a free flowing molten condition in the dipping pans forming a part of the machine.

A still further important object of my invention is the provision of means whereby the trimming saws adjust relative to the length of the ears of corn and whereby the dipping and cooling pans can be raised and lowered to suit different lengths of ears of corn.

A still further important object of my invention is the provision of a machine cooperating with the trimming and dipping machine for initially treating the ears for trimming off husk leaves or flags prior to the trimming and dipping.

With these and other objects in view, the invention consists in the novel construction, arrangement and formation of parts, as will be hereinafter more specifically described and claimed, and illustrated in the accompanying drawings, in which drawings, Figure 1 is a side elevational view of the machine for trimming, waxing and cooling ears of corn and for initially removing excess leaves or flags from the ears, parts of the figure being shown broken away and in section to illustrate structural detail;

Figure 3 is an enlarged detail transverse sectional view through the machine taken on the line 3—3 of Figuse 1, looking in the direction of the arrows, the view illustrating the corn gripping and carrying saddles and the guide tracks for the saddles;

Figure 4 is an enlarged fragmentary detail transverse secional view taken on the line 4—4 of Figure 1, looking in the direction of the arrows, the view showing one of the saddles tilted to a vertical position to partially immerse a trimmed ear of corn in the wax dipping pan, and Figure 5 is a detail perspective view illustrating one of the corn gripping saddles.

Figure 1:
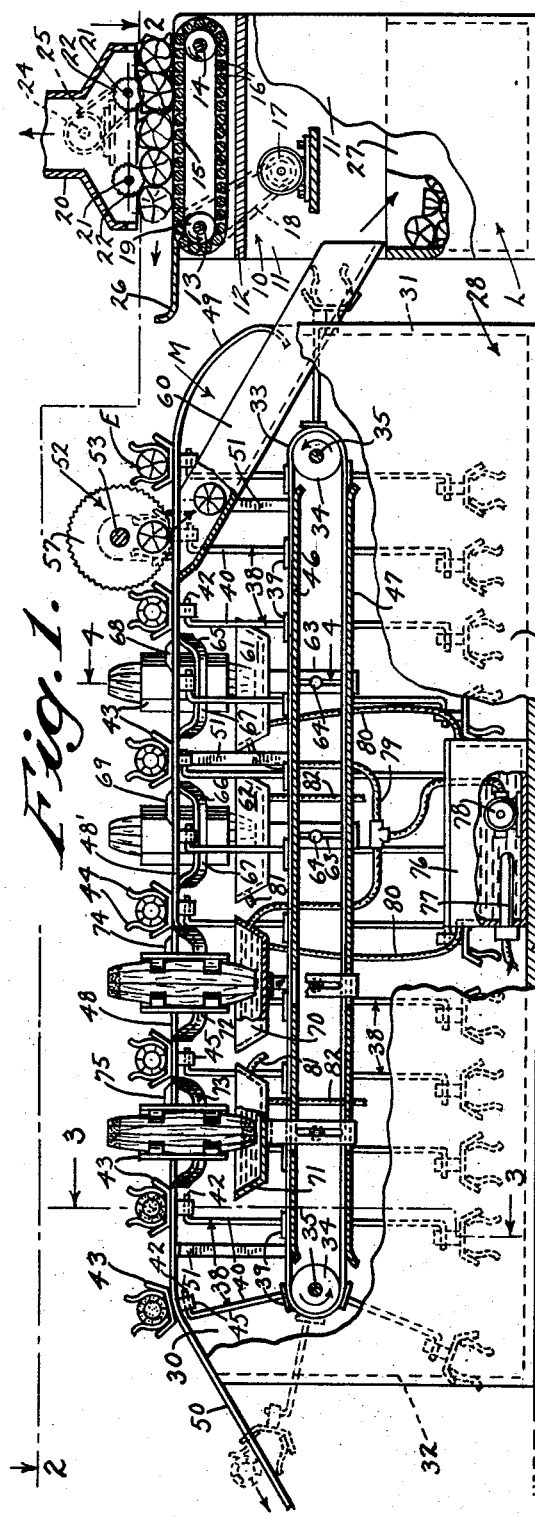
Figure 2:
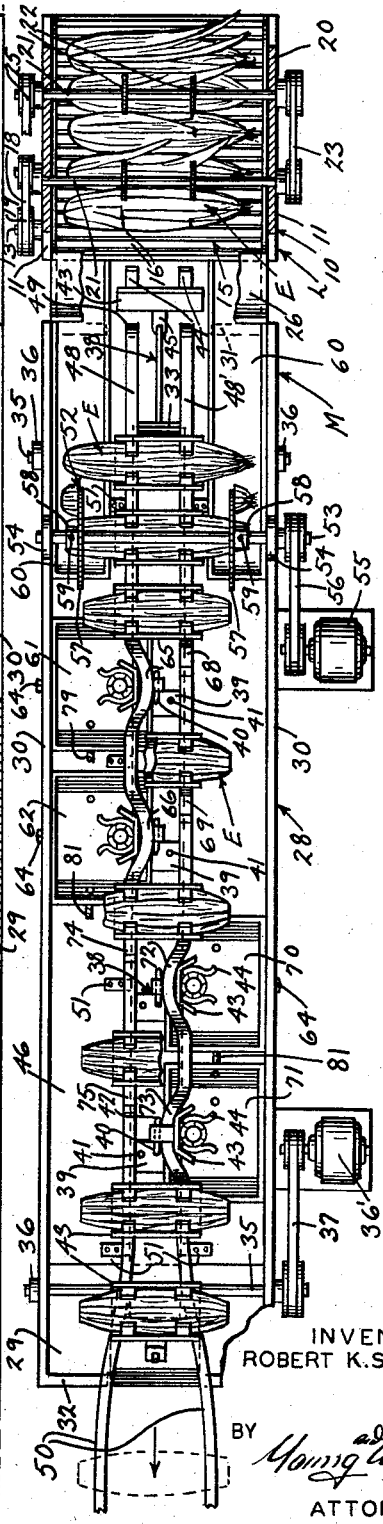
Figure 2 is a top plan view of the machine for trimming, dipping and cooling the wax and for removing excess leaves or flags from the husk, certain parts of the latter machine being shown in horizontal section and the said section being taken on the line 2—2 of Figure 1, looking in the direction of the arrows.

Referring to the drawings in detail, wherein similar reference characters designate corresponding parts throughout the several views, the letter L generally indicates the machine for trimming excess leaves or flags from the ears of corn and the letter M generally indicates my machine for trimming the ends of the corn, for waxing the trimmed ends and for cooling the waxed ends.

The machine L is of a diagrammatic nature and shows one form of means for trimming or removing the leaves or flags from the ears of corn. This machine includes a hollow base 10 preferably formed from side walls 11 and a table top 12. The side walls 11 extend above the table top and carry suitable bearings for spaced shafts 13 and 14 for operating an endless belt 15. The belt preferably includes a plurality of freely rotatable rollers 16 and the ears of corn E are placed on the upper run of this belt and the ears are carried through the machine L. The belt is driven in any preferred manner, such as through the use of an electric motor 17. The motor drives a belt 18 and this belt is trained about a pulley 19, keyed or otherwise secured to the shaft 13.

Arranged above the upper run of the endless roller belt 15 is a suction hood 20, the purpose of which will later appear. Rotatably carried by the hood 20 at spaced points are rotatable mandrels 21 and these mandrels have secured thereto circular saws or knives 22. These circular saws or knives 22 are also arranged in spaced relation relative to one another and the mandrels are operatively connected together by a pulley belt 23. One mandrel is driven from an electric motor 24 through the medium of a belt 25. The inner end of the machine carries a receiving shelf 26 and as the ears of corn E travel with the belt 15 the ears are deposited on this shelf. The operator then grasps the ears and inserts the same into the machine M, as will be later described.

As the ears of corn are placed on the belt the circular saws or knives 22 engage the periphery thereof and trim off any projecting leaves or flags. As the conveyor belt 15 is formed from freely rotatable rollers, the ears tend to turn as the belt travels and as two sets of mandrels and saws are provided, the excess leaves can be easily cut.

At this time, it is to be noted that the machine L is placed in close relation to the front or loading end of the machine M. The base of the machine L forms means for receiving a waste receiving basket 27 and the trimmed portions of the ears of corn (as will also later appear), fall into this basket or container 27.

The machine M includes a base or frame 28 of any preferred character. As illustrated, this base or frame includes a bottom wall 29 and upright spaced side walls 30. The ends of the machine are partially closed by end walls 31 and 32. Extending longitudinally of the frame and confined within the frame housing 28, is a longitudinally extending endless conveyor belt 33. The belt can be of any desired character, but I have shown the same to be of an endless band of leather, loop or flexible metal and this belt at its opposite ends is trained about drive rollers 34 keyed or otherwise secured to shafts 35. These shafts are rotatably mounted in bearings 36 carried by the side walls 30. One shaft 35 is driven from an electric motor 36' through the medium of a drive pulley belt 37. The conveyor belt 33 carries at equidistantly spaced points corn conveyor members 38. Each one of the corn conveyor members 38 includes a base plate 39 and an upright post 40 formed on or secured to the base plate. Each base plate 39 is riveted adjacent to its longitudinal center, as at 41, to the conveyor belt 33. The upper end of each post 40 is bent at right angles to provide a laterally projecting bearing arm 42. It is to be noted that the bearing arms 42 are in longitudinal alignment with one another. Rockably mounted on each bearing arm 42 is a corn receiving trough or saddle 43. The saddle is of a substantially U-shape in cross-section and the side walls of each saddle adjacent to their ends carry spring clips 44 and the ears of corn are sprung into these clips and are firmly gripped by the clips. The lower face of each saddle at its transverse center carries a bearing 45 which receives a bearing arm. By this construction, it can be seen that each trough or saddle is free to rock transversely of the machine from one side to the other. The upper run of the belt travels over a supporting platform 46 and this platform can be secured to the side walls 30 of the frame housing 28. The lower run of the belt 33 can be supported by a longitudinally slotted table 47 and the slot in the lower table 47 forms means for the passage of the corn carrying members 38 therethrough.

Extending the full length of the machine are spaced guide and supporting tracks 48 and 48'. These tracks form an important part of this invention and the corn carrying members 38 ride between the tracks and the troughs or saddles 43 ride on top of the tracks. It is to be noted that the forward ends of the tracks are curved arcuately downwardly, as at 49, so that as the belt travels, the saddles or troughs will be effectively guided up and onto the tracks. The rear ends of the tracks are spread apart and inclined downwardly, as at 50, and the tracks are spread a sufficient distance apart to permit the saddles or troughs 43 to ride therebetween. However, the spread portions 50 of the tracks are spaced apart such a distance that the tracks will engage the ends of the ears of corn and thus, pull the ears of corn from the saddles as the saddles swing downwardly for their return passage.

The tracks 48 and 48' can be supported by brackets 51 secured to the upper table 46. Obviously, with the saddles resting on the tracks 48 on opposite sides of their pivots, the saddles and hence the ears of corn are held firmly in a horizontal position.

Mounted adjacent to the front or receiving end of the machine is the corn ear trimming mechanism 52. This corn trimming mechanism includes a rotary mandrel 53 which extends transversely across the machine above the saddles or troughs 43. The mandrel is rotatably mounted in bearings 54 mounted on the side plates or walls 30 of the frame housing. The mandrel is driven at a desired rate of speed from an electric motor 55 through the medium of a drive belt 56. Mounted on the mandrel 53 adjacent to its opposite ends are circular saws 57. The saws are carried by hubs 58 and the hubs can be fastened to the mandrel 53 by set screws 59. This provides means for permitting the saws to be adjusted toward and away from one another to suit varying lengths of ears of corn. At this point, it may be noted that the corn is graded as to size and one size is initially treated by the machine and when a different size is being treated the saws will then adjust accordingly. The saws themselves are of a sufficient diameter to extend below the ears of corn carried by the saddles and hence as the ears of corn travel through the machine the same are initially brought against the saws and the saws effectively trim off the opposite ends of the ears. This waste material is caught by a trough 60 that leads downwardly and out of the machine and terminates above the waste container or basket 27. The trough can be secured in any desired fashion to the housing frame 28.

The operator stands at the front or loading station of the machine M and takes the corn from the shelf 26 and places the corn correctly in the saddles 43.

As the trimmed ears of corn travel past the trimming saws 57, the ears are waxed and the wax is cooled. Arranged under the track 48 is a molten wax receiving dipping pan 61 and a cooling pan 62. Each of these pans 61 and 62 are supported on brackets 63 and the brackets are adjustably carried by the side walls 30. Hence, these pans can be adjusted up and down according to the length of the ears of corn being treated. It is to be noted that the brackets 63 are longitudinally slotted for receiving holding bolts 64, carried by the side walls of the machine.

Now referring more particularly to the track 48, it can be seen that this track directly above the pans 61 and 62 is provided with downwardly inclined and curved loops 65 and 66. The outer edges of these loops are provided with vertical guide flanges 67, best shown in Figure 4 of the drawings. The track 48' directly opposite the loops 65 and 66 is provided with tilting cams 68 and 69. As the troughs or saddles 43 ride on the tracks 48 and 48' past the saws, the troughs first strike the cams 68 and the saddles are tilted off center and the saddles follow the contour of the loop 65 and the saddle following the contour of the loop rides in a vertical plane and one end of the ear of corn carried thereby is dipped into the molten wax for a limited distance. As this saddle travels further, the same is momentarily lifted back to its horizontal position and the saddle then strikes the cam 69 and the saddle is again tilted and follows the contour of the loop 66 and the treated end of the ear of corn is immersed in the cooling water in the tank 62. This immediately sets the wax and the saddle and its ear of corn then moves back to its horizontal position and hence one end of each ear of corn as the same travels through the machine is waxed and cooled.

Beyond the waxing pan 61 and the cooling pan 62 is a second waxing pan 70 and a cooling pan 71. These pans are arranged below the track 48'. The track 48' directly above the pans 70 and 71 is provided with depending and curved guide loops 72 and 73. The track 48 directly opposite these loops is provided with tilting cams 74 and 75. As the corn reaches the cams 74 and 75 and the loops 72 and 73, the corn is tilted to a vertical position on the opposite side of the machine and hence the opposite ends of ears of corn are first dipped in the pan 70 and waxed and are then dipped in the cooling pan 71 and the wax is set. The saddles then ride to their horizontal position and the saddles ride between the spread portions 50 of the tracks 48 and 48' and the ears of corn are lifted out of the saddles and the same roll down the track portions 50 to a suitable receptacle, not shown. The pans 70 and 71 are also carried by a side wall 30 of the housing frame 28 and can also be adjusted as to height.

Arranged within the housing frame is a master tank 76 for wax and the wax is reduced to a molten condition by an electric heater 77 of the immersion type. Arranged in the master tank 76 is a pump 78 and the outlet of the tank is connected by flexible hoses 79 to the waxing pans 61 and 70. The bottoms of the tanks are provided with return hoses 80 which lead to the master tank 76. Water is supplied to the cooling tank 62 and 71 in any preferred manner, and as shown, I provide each pan 62 and 71 with a water feed hose 81 and a return hose 82. The water can be chilled in any desired manner such as by the use of refrigerating coils or the like.

While I have shown an immersion heater 77 in the master tank 76 for the wax, it is to be understood that any desired type of heating means can be employed and, in fact, the wax pans 61 and 70 can be provided with auxiliary heaters, should such be desirable.

It is to be understood also that the ears can be dipped twice in wax at each end so as to provide two thin layers of sealing wax.

It is also proposed to utilize end labels for the ears and these labels can be merely pressed into the waxed ends of the corn.

Means can also be provided for grasping and stripping down a portion of the husk of the ears so as to expose some rows of corn kernels to view. It is not necessary to strip down the husk of all ears.

From the foregoing description, it can be seen that I have provided a simple but effective machine for sawing off the ends of ears of corn square and for waxing and sealing the opposite ends of the trimmed ears.

The machine shown in the drawings is by way of example only, and various changes in details of construction can be made thereto, providing the same do not depart from the spirit or the scope of this invention as defined by the following claims.

I claim:

1. A machine for preparing fresh corn for the retail trade comprising a frame, an endless conveyor in said frame and travelling longitudinally thereof, saddles carried by the conveyor and extending transversely thereof and transversely of the machine, releasable means for holding ears of corn in the saddles with the ends of the ears of corn protruding beyond the saddles, pans of melted wax arranged alongside of the conveyor, and means adjacent to said pans for alternately swinging the saddles from one side to the other toward said pans for immersing the protruding ends of the corn into said pans for coating the opposite ends of the corn with the wax in said pans.

2. A machine for preparing fresh corn for the retail trade comprising a frame, a conveyor mounted in said frame for travelling movement longitudinally of the frame, equidistantly spaced corn receiving saddles carried by the conveyor and extending transversely of the conveyor and the frame, means releasably holding ears of corn in the saddles with the ends of the ears of corn protruding beyond the saddles, means carried by the frame and extending transversely of the conveyor for trimming off the ends of the ears of corn during the travel of the conveyor, pans of melted wax disposed on opposite sides of the conveyor, and means for alternately moving the saddles on opposite sides of the conveyor and toward the pans of wax for immersing the ends of the corn in the wax.

3. A machine for preparing fresh corn for the retail trade as defined in claim 2, and means including a table carried by the frame over which the upper run of the conveyor travels for firmly supporting the upper run of the conveyor against lateral twisting during its travelling movement.

4. A machine for treating fresh ears of corn for the retail trade as defined in claim 2 and means for automatically stripping the ears of corn from the saddles after the waxing of the ends of the corn.

5. A machine for preparing fresh corn for the retail trade as defined in claim 2, and means for immediately cooling the dipped ends of the ears for setting the wax.

6. A machine for preparing ears of corn for the retail trade as defined in claim 2, and means for carrying the trimmed ends of the corn away from the machine.

7. A machine for preparing fresh corn for the retail trade comprising a frame, a conveyor mounted in said frame for traveling movement longitudinally of the frame, equidistantly spaced corn receiving saddles carried by the conveyor and extending transversely of the conveyor and the frame, means releasably holding ears of corn in the saddles, means carried by the frame and extending transversely of the conveyor for trimming off the ends of the ears of corn during the travel of the conveyor, pans of melted wax disposed on opposite sides of the conveyor, and means for alternately moving the saddles on opposite sides of the conveyor and toward the pans of wax for immersing the ends of the corn in the wax, means for immediately cooling the waxed ends of the corn for setting the wax, and means for automatically stripping the ears of corn from the saddles after the waxing and cooling of the wax.

8. A machine for preparing fresh corn for the retail trade comprising a frame, an endless conveyor belt supported by said frame and travelling longitudinally of the frame, means for firmly supporting the upper run of the conveyor during its travelling movement, equidistantly spaced posts secured to the conveyor and adapted to project outwardly therefrom, corn receiving saddles extending transversely of the conveyor and the frame rockably mounted at their transverse centers on the posts, means in the saddles for releasably gripping the corn, a pair of spaced guide tracks arranged in spaced relation to the upper run of said conveyor for normally supporting the saddles on the upper run of the conveyor in a horizontal plane, means arranged transversely of the upper run of the conveyor for trimming off the opposite ends of the ears in the saddles during the travel of the conveyor and the movement of the saddles on the tracks, pans of melted wax located on opposite sides of the tracks and beyond the corn trimming means, said tracks above said pans having downwardly projecting guide loops whereby to guide the saddles to a tilted position above said pans with the ears of corn carried thereby partially immersed in the melted wax in said pans.

9. A machine for preparing fresh ears of corn for the retail trade as defined in claim 8, and said tracks beyond the pans of melted wax being spread apart a sufficient distance to permit the saddles to pass therethrough, and said tracks at the spread portion being inclined downwardly for engaging the opposite ends of the corn and to strip the corn from the saddles as the saddles pass through said spread portion of the tracks.

10. A machine for preparing fresh corn for the retail trade as defined in claim 8 and cams carried by the track disposed in the path of the saddles for positively tilting said saddles toward said loops.

11. A machine for preparing fresh corn for the retail trade, as defined in claim 8, and means including cooling pans for setting the wax immediately after the dipping of the ends of the corn in the pans of wax.

References Cited in the file of this patent

UNITED STATES PATENTS

| | | |
|---|---|---|
| 1,004,033 | Johnson | Sept. 26, 1911 |
| 1,270,755 | Holmberg | June 25, 1918 |
| 2,109,365 | Carll et al. | Feb. 22, 1938 |
| 2,128,028 | Hampton | Aug. 23, 1938 |
| 2,298,631 | Siewing | Oct. 13, 1942 |
| 2,464,529 | Recker | Mar. 15, 1949 |
| 2,664,090 | Morrison | Dec. 29, 1953 |
| 2,675,808 | Hecht | Apr. 20, 1954 |